No. 892,106. PATENTED JUNE 30, 1908.
E. G. WILLIAMS.
COTTON CHOPPER.
APPLICATION FILED AUG. 13, 1907.

3 SHEETS—SHEET 1.

No. 892,106. PATENTED JUNE 30, 1908.
E. G. WILLIAMS.
COTTON CHOPPER.
APPLICATION FILED AUG. 13, 1907.

3 SHEETS—SHEET 2.

No. 892,106. PATENTED JUNE 30, 1908.
E. G. WILLIAMS.
COTTON CHOPPER.
APPLICATION FILED AUG. 13, 1907.

3 SHEETS—SHEET 3.

Witnesses  
Inventor  
E. G. Williams  
By  
Attorney  
Woodward & Chandler

UNITED STATES PATENT OFFICE.

EDWIN G. WILLIAMS, OF CARNEY, OKLAHOMA.

COTTON-CHOPPER.

No. 892,106.

Specification of Letters Patent.

Patented June 30, 1908.

Application filed August 13, 1907. Serial No. 388,401.

*To all whom it may concern:*

Be it known that I, EDWIN G. WILLIAMS, citizen of the United States, residing at Carney, in the county of Lincoln and State of Oklahoma, have invented certain new and useful Improvements in Cotton-Choppers, of which the following is a specification.

This invention relates to farm implements, and more particularly to cotton choppers, and has for its object to provide a chopper which will be arranged for adjustment to suit different conditions, and which will include a novel and convenient arrangement of parts.
Other objects and advantages will be apparent from the following description and it will be understood that changes in the specific structure shown and described may be made within the scope of the claims without departing from the spirit of the invention.

Figure 1:
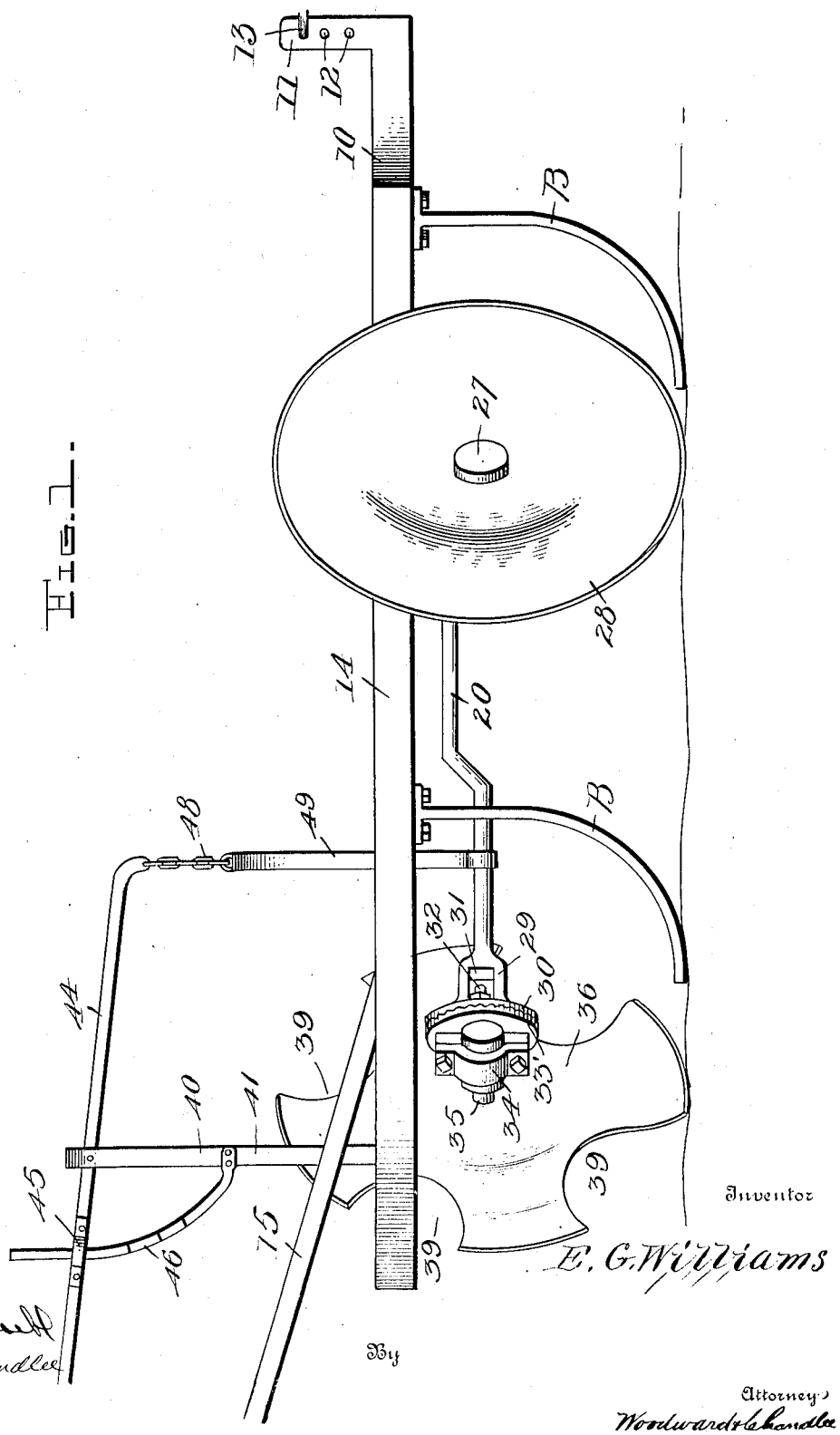
Figure 2:
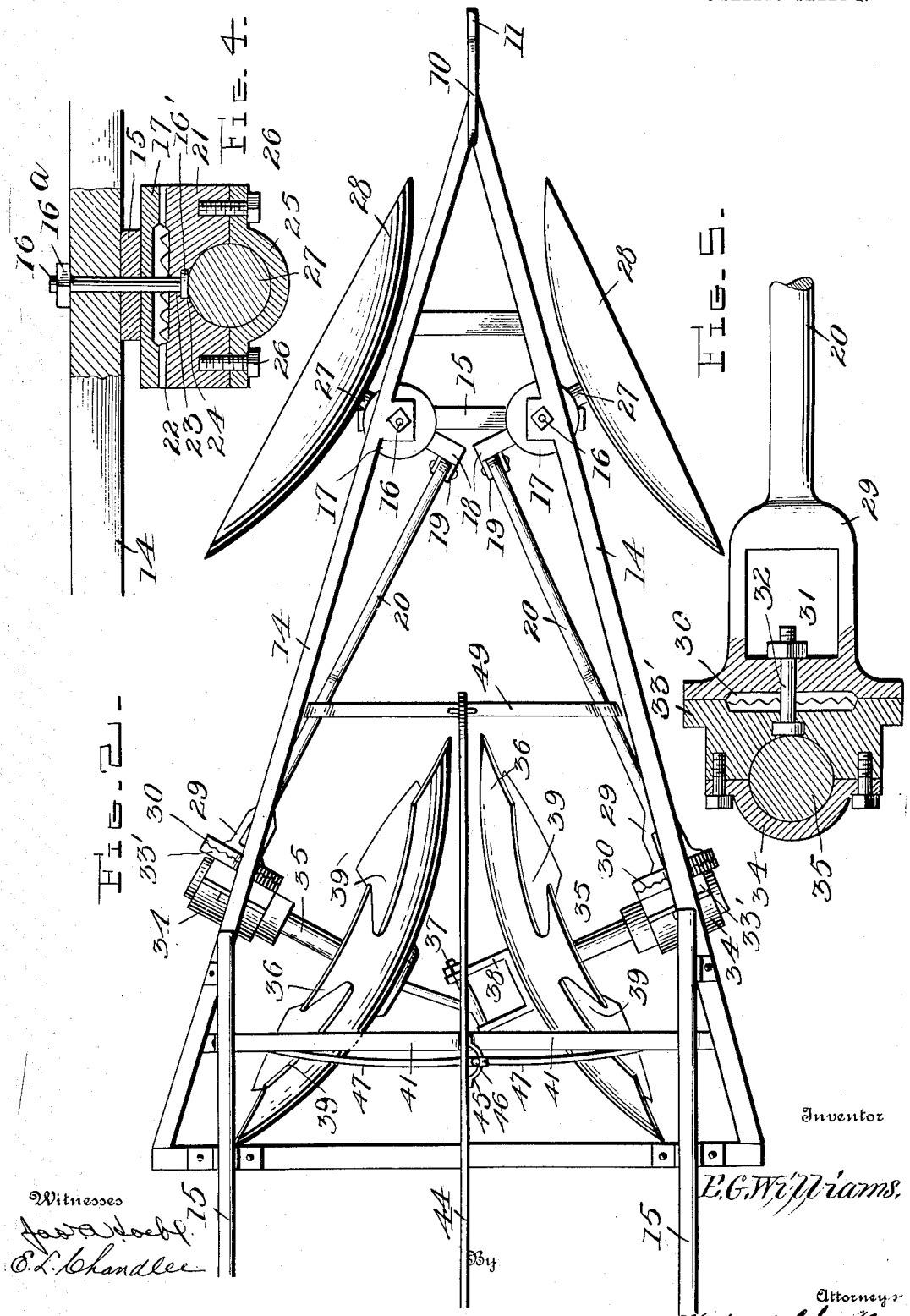
Figure 3:
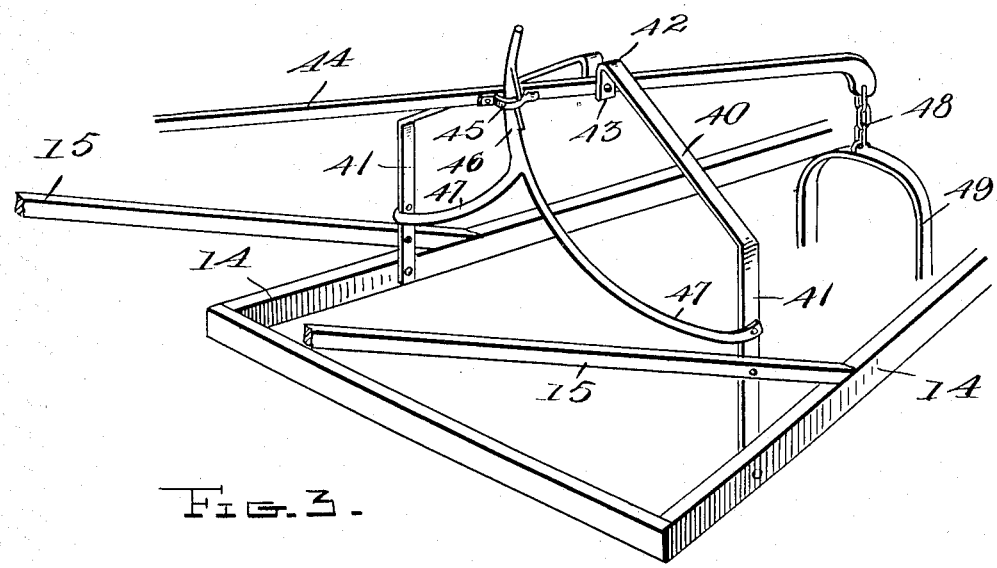
Figure 6:
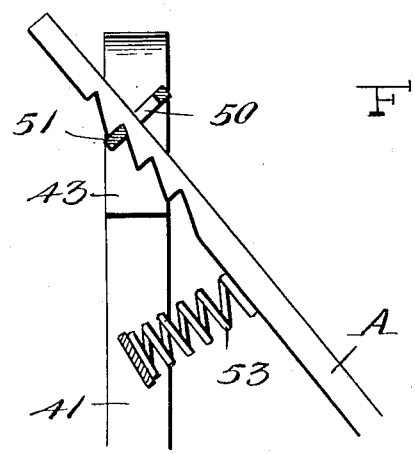

In the drawings forming a portion of this specification, and in which like numerals of reference indicate similar parts in the several views, Figure 1 is a side elevation of the present invention; Fig. 2 is a top plan; Fig. 3 is a detail perspective view; Fig. 4 is a detail section through the box for one of the forward disks; Fig. 5 is a detail section through the box for one of the notched disks; Fig. 6 is a detail section of a modified form of the disk adjusting means.

Referring now to the drawings, the present invention includes a longitudinal, horizontally extending draft bar 10, having its forward portion turned upwardly as shown at 11 and provided with a longitudinal series of perforations 12 in order that a clevis 13 may be adjusted vertically thereon.

At its rearward end, the draft bar 10 is secured to a pair of rearwardly divergent members 14 having guiding handles 15 secured thereto at their rearward portions. The draft bar has its rearward end secured between the forward ends of the beams 14, and disposed against the under faces of the beams at their forward extremities, there is a transversely extending plate 15. Bolts 16 are passed through the end portions of the plate 15 and through the members 14 and these bolts have circular radially notched plates 17 engaged therewith beneath the plate 15 and with their notched faces directed downwardly. The plates 17 carry rearward extensions 18 provided with transversely spaced depending ears 19 in which are pivoted the forward ends of rearwardly extending arms 20, which are thus arranged for vertical pivotal movement. A half-box 21 has a radially notched upper face 22, as shown, and has a central opening 23 in which the lower portion of each bolt 16 is engaged for coöperation of the notched faces of the half-box and plate 17 to hold the half-box at different points of its pivotal movement with the bolt 16, the latter having a head 16' seated in a recess 24 formed in the inner face of the half-box. A nut 16ª is engaged with the upper end of each bolt 16 and may be operated to clamp the half-boxes against the plates 17. A second half-box 25 is secured in operative relation to each half-box 22 by means of bolts 26. Engaged in each bearing formed by the half-boxes, there is a spool shaped stub shaft 27, carrying a vertically extending excavating disk 28 at its outer end. These disks are arranged to uncover the rows of cotton plant, as will be readily understood, and through the structure just described, the disks are adjustable to suit different conditions.

The rearward ends of the arms 20 carry members 29 having radially notched circular rearward faces 30 and having openings 31 formed therethrough at their forward portions. A bolt 32 is engaged through the rearward portion of each member 39 and extends rearwardly from the center of the notched face 30. Engaged with this bolt 31, there is a half-boxing 33 similar to the half-boxing 22, and having a notched face 33' for cooperation with the face 30. This half-boxing 33 carries a half-boxing 34. A bearing is thus formed at the rearward end of each arm 20 for the reception respectively of stub shafts 35, these shafts extending at their inner portions through the centers of chopping disks 36. Inwardly of the disks, the stub shafts carry the members 37 and 38 of a knuckle which thus connects the two disks for simultaneous rotation and it will be observed that the mounting of the bearings is such that the disks may be adjusted to vary their angle.

By reason of the rearward divergence of the arms 20, the disks are brought together at their lower forward portions, and the disks are provided with peripheral notches 39, as shown. The connection of the disks is such that the notches thereof are brought into registration, and the arrangement is thus such that the cotton plants remain uncut at the points at which the registration of the notches occurs.

An upwardly extending arch 40 is secured to the rearward portions of the members 14 and to the handles 15, the arch thus acting to brace the handles. The arch consists of two spaced members 41 which have their upper ends turned inwardly as at 42, and then downwardly as at 43, the portions 43 being secured together adjacent to the portions 41 and being separated at their lower ends. A longitudinally extending lever 44 is pivoted between the lower ends of the downwardly turned portions 43 and rearwardly of the pivot point, the lever carries a guide 45, through which is engaged an upwardly extending notched rod 46 which is bifurcated at its lower end and has its resultant spaced portions 47 secured to the members 41 of the arch. As will be readily understood, the lever may be moved laterally to a slight extent to engage the guide with the notches of the rod 46 and thus hold the lever at different points of its pivotal movement. The forward end of the lever 44 is connected by means of a chain 48 with a yoke 49 secured at the lower ends of its legs to the rearward portions of the arms 20 and it will thus be seen that operation of the lever results in vertical movement of the arms 20 and therewith the disks 36.

In Fig. 6, there is shown a form of the invention in which the guide 45 and member 46 are omitted, a notched rod A being secured to the yoke 49 and passed through an opening 50 formed in a plate 51 secured between the upper portions of the downwardly turned portions 43 of the members 41. This rod A is movable for engagement of its notches with the edge of the opening 50, and thus the disks may be held at different points of their vertical movement. A spring 52 is arranged to hold the rod A yieldably in position to engage its notches with the plate 51.

As will be readily understood, the forward disks 28 excavate the earth from the cotton plants which are then chopped by the disks 36. Suitable supports are provided for the implement, which are disclosed as runners B in the drawings.

What is claimed is:

1. In an implement of the class described, the combination with horizontally adjustable excavating disks, of vertically adjustable chopping disks, said chopping disks being mounted for rotation in diagonal planes rearwardly of the excavating disks, the chopping disks having registering peripheral notches, connections between the excavating and chopping disks, and means for moving the chopping disks in a vertical plane.

2. In an implement of the class described, the combination with frame members, of disks arranged for vertical movement with respect to the frame members, an upwardly extending arch secured to the frame members and having their spaced members at the upper ends turned inwardly and then downwardly, a lever pivoted between the downwardly turned ends, and connections between the lever and disks for simultaneous movement thereof.

In testimony whereof he affixes his signature, in presence of two witnesses.

EDWIN G. WILLIAMS.

Witnesses:
J. R. PAGE,
E. W. ERISMAN.